United States Patent [19]

Maeda et al.

[11] Patent Number: 4,620,939

[45] Date of Patent: Nov. 4, 1986

[54] SCINTILLATION CONVERTER FOR NEUTRON RADIOGRAPHY

[75] Inventors: Masahiko Maeda, Tokyo; Naotochi Watanabe, Kanagawa, both of Japan

[73] Assignee: Showa Denko Kabushiki Kaisha, Tokyo, Japan

[21] Appl. No.: 697,823

[22] Filed: Feb. 4, 1985

[30] Foreign Application Priority Data

Feb. 2, 1984 [JP] Japan .................................. 59-16135
Sep. 19, 1984 [JP] Japan ................................ 59-194765
Sep. 19, 1984 [JP] Japan ................................ 59-194766
Oct. 4, 1984 [JP] Japan ................................ 59-207044

[51] Int. Cl.$^4$ ............................................. C09K 11/06
[52] U.S. Cl. .......................... 252/301.17; 250/361 R; 252/301.18
[58] Field of Search ...................... 252/301.17, 301.18

[56] References Cited

U.S. PATENT DOCUMENTS

| | | | |
|---|---|---|---|
| 2,559,219 | 7/1951 | Ludeman | 252/301.17 |
| 2,745,967 | 5/1956 | Ludeman | 252/301.17 |
| 3,758,412 | 9/1973 | Grum et al. | 252/301.17 |
| 4,088,508 | 5/1978 | Gravisse | 252/301.17 |
| 4,374,749 | 2/1983 | Cusano et al. | 252/301.18 |
| 4,533,489 | 8/1985 | Utts et al. | 252/301.17 |

Primary Examiner—Arthur P. Demers
Attorney, Agent, or Firm—Sughrue, Mion, Zinn, Macpeak, and Seas

[57] ABSTRACT

A scintillation converter for neutron radiography is described, comprising a composition formed of components (A) 100 parts by weight of an olefin rubber made mainly of ethylene and propylene, (B) from 100 to 400 parts by weight of at least one inorganic compound selected from the group consisting of inorganic boron compounds and inorganic lithium compounds, and (C) from 100 to 600 parts by weight of a zinc sulfide-base fluorescent material. This scintillation converter is not only superior in radiation-sensitive performance, but also has high elasticity and superior abrasion resistance.

9 Claims, 1 Drawing Figure

SCINTILLATION CONVERTER FOR NEUTRON RADIOGRAPHY

FIELD OF THE INVENTION

The present invention relates to a scintillation converter for radiography (neutron fluorescent screen). More particularly, it is concerned with a scintillation converter for neutron radiography superior to conventional converters not only in radiation sensitivity but also in elasticity and abrasion resistance.

BACKGROUND OF THE INVENTION

With marked growth of atomic energy industry, radiation shielding in atomic energy facilities has become of significant importance in recent years. In fields such as analytical chemistry and medical treatment, radiation has also been increasingly utilized. Thus it has been desired to develop a radiation-shielding material and a radiation-sensitive material. In particular, a highly radiation-sensitive material has been desired not only for the protection of operators from the danger of exposure to radiation, but also in fields such as chemical and structural analyses utilizing radiation, and measurement of integrated intensity of radiation.

Heretofore, a radiation-sensitive material comprising a sheet-shaped mold with a composition containing a fluorescent pigment emitting light upon irradiation with radiation (e.g., calcium tungstate and silver-activated zinc sulfide) coated on the surface thereof has been used. These fluorescent pigments, however, are of low sensitivity and can sense only a large dose of radiation. Moreover, such conventional fluorescent pigments give rise to problems such as generation of secondary radiation. Thus the conventional radiation-sensitive material is not sufficiently useful as a material for sensing a small dose of radiation. In particular, in view of safety problems such as shielding of radiation and environmental pollution as well as the generation of secondary radiation, the fluorescent pigments are limited in their use.

Japanese Patent Application (OPI) No. 133349/81 (the term "OPI" as used herein means a "published unexamined Japanese patent application") discloses a scintillation converter for neutron radiography which is produced by molding a composition composed of polyethylene, an inorganic boron compound, and a zinc sulfide-base fluorescent material. This scintillation converter for neutron radiography, however, has several disadvantages because polyethylene is used as a polymeric material. For example, when the composition is molded into a sheet, for example, shrinkage occurs, and when the sheet is bonded to a metallic plate (e.g., an aluminum plate), it is bent. Thus, when the state or structure of the inside of a test specimen is examined, measured and photographed after irradiation with neutron radiation, an accurate image cannot be obtained. In extending the plate surface by press molding at a temperature at which the polyethylene becomes molten, it is necessary to increase the pressing pressure, and, furthermore, the area can be extended only to a small extent. Thus a scintillation converter having a large surface area is difficult to produce. Moreover, since the molten tension drops, it is necessary to raise the press temperature; this leads to brown coloration of the zinc sulfide and a reduction in fluorescent performance.

SUMMARY OF THE INVENTION

As a result of extensive investigations to overcome the above problems, it has been found that a scintillation converter for neutron radiography comprising a composition formed of components (A) an olefin rubber made mainly of ethylene and propylene, (B) at least one inorganic compound selected from the group consisting of inorganic boron compounds and inorganic lithium compounds, and (C) a zinc sulfide-base fluorescent material, and optionally (D) an organic peroxide or at least one of sulfur and a sulfur donor, does not generate secondary radiation, is effective in shielding radiation, is superior in sensing radiation (particularly, neutron radiation), and possesses excellent elasticity and abrasion resistance.

Thus, the present invention relates to a scintillation converter for neutron radiography comprising a composition formed of components (A) 100 parts by weight of an olefin rubber made mainly of ethylene and propylene;

(B) from 100 to 400 parts by weight of at least one inorganic compound selected from the group consisting of inorganic boron compounds and inorganic lithium compounds; and (C) from 100 to 600 parts by weight of a zinc sulfide-base fluorescent material.

Further, if desired, according to a preferred embodiment, the composition is also formed of component (D) from 0.1 to 10.0 parts by weight of an organic peroxide or at least one of sulfur and a sulfur donor.

BRIEF DESCRIPTION OF THE DRAWING

FIGURE is a neutron radiography of images of various quality indicators obtained using the scintillation converter for neutron radiography of the present invention.

DETAILED DESCRIPTION OF THE INVENTION (A) Olefin-based rubber

The olefin-based rubber used in this invention is composed mainly of ethylene and propylene. In other words, it is typically a rubbery substance selected from the group consisting of EPR and EPDM. EPR is obtained by copolymerizing ethylene and propylene. EPDM is a multicomponent polymer rubber composed of ethylene and propylene and a small amount of other monomer having one or two double bonds. Examples of such monomer include linear or branched diolefins having two double bonds at the terminals such as 1,4-pentadiene, 1,5-hexadiene, and 3,3-dimenthyl-1,5-hexadiene; linear or branched diolefins having one double bond at the terminal such as 1,4-hexadiene and 6-methyl-1,5-heptadiene; and cyclic diene hydrocarbons such as bicyclo-[2,2,1]-heptene-2(norbornene) and derivatives thereof (e.g., ethylidene norbornene).

In EPR and EPDM, the weight ratio of ethylene monomer units to propylene monomer units is preferably from 20/80 to 80/20. In addition, the other monomer unit may be contained in EPDM in an amount of less than 10 wt %. These rubbery substances are industrially produced by using a catalyst composed mainly of a transition metal compound and an organometal compound (usually an organoaluminum compound). These rubbery substances preferably have a Mooney viscosity of from 20 to 140, and more preferably from 30 to 120. M.I. of the rubber substances is generally from 0.1 to 6 g/10 min (as measured according to ASTM D-1238, at 190° C. under a load of 2.16 kg).

Methods for producing the olefin-based rubber and its properties are well known, as described in *Encyclopedia of Polymer Science and Technology*, vol. 5, p. 414 and vol. 6, pp. 359–384.

In the production of the scintillation converter of the present invention, the above olefin rubber may be used singly or in combination with other polymeric materials compatible with the olefin rubber. Polymeric materials which can be used for this purpose include rubber materials such as silicone rubber, and resins such as an ethylene/ethyl acrylate copolymer, an ethylene/methyl methacrylate copolymer, and an ethylene/acryl acrylate copolymer. The amount of these polymeric materials added is 50 parts by weight or less per 100 parts by weight of the olefin rubber.

(B) Inorganic Boron Compound

Of inorganic boron compounds which can be used in the present invention, those compounds not containing metal (non-metallic) are preferably used. Typical examples of such preferred inorganic boron compounds are boron carbide, boron nitride, boric anhydride, orthoboric acid, metaboric acid, and tetraboric acid. Of these compounds, boron nitride is particularly preferred. The weight average diameter of these inorganic boron compounds is desirably from 0.5 to 500 $\mu$m, with the range of from 3.0 to 300 $\mu$m being particularly preferred. In the case of boron nitride, it is desirable depending on the extent of growth of the crystals that the true density be from 1.88 to 2.27 g/cm$^3$, the weight average diameter from 0.7 to 6.0 $\mu$m, and the surface area from 14 to 35 m$^2$/g. It is particularly preferred that the true specific gravity be at least 2.0 g/cm and the weight average diameter at least 3.0 $\mu$m. In addition, those compounds containing a large amount of B$^{10}$ having a large neutron absorbing cross section are suitable.

(C) Inorganic Lithium Compound

Inorganic lithium compounds which can be used in the present invention include lithium halides (e.g., lithium fluoride, lithium chloride, and lithium bromide), lithium oxide, lithium hydroxide, and lithium carbonate. Particularly preferred is lithium fluoride. The weight average diameter of these lithium compounds is desirably from 0.5 to 500 $\mu$m, with the range of from 3.0 to 300 $\mu$m being particularly preferred.

(D) Zinc Sulfide Base Fluorescent Material

The zinc sulfide-base fluorescent material that is used in the present invention is zinc sulfide activated with metals such as silver, copper, manganese, and lead. Silver-activated zinc sulfide is desirably used in the present invention. The weight average diameter of the zinc sulfide-base fluorescent material is preferably from 1.0 to 50 $\mu$m (powder form), with the range of from 5 to 10 $\mu$m being particularly preferred.

The scintillation converter of the present invention can be produced from the above olefin rubber, inorganic born compound and/or inorganic lithium compound, and zinc sulfide-base fluorescent material.

Furthermore, addition of organic peroxides, or at least one of sulfur and a sulfer donor enables to produce a scintillation converter for neutron radiography having high elasticity and superior in abrasion resistance. The scintillation converter of the present invention can be used in a flat form or a curved form. Moreover, when a photographic negative film is placed on the front surface of the scintillation converter of the present invention, intimate contact between the film and the surface can be attained, and the surface is less worn out. Thus the scintillation converter of the present invention yields an effect that a photograph of high sharpness can be obtained.

(E) Organic Peroxide

Any organic peroxides can be used in the present invention. In particular, those peroxides having a decomposition temperature (a temperature at which the half-life is 1 minute) of 120° C. or more are desirable, with those peroxides having a decomposition temperature of 140° C. or more being more preferred. Typical examples of such desirable organic peroxides are ketone peroxides such as 1,1-bis-tert-butyl peroxy-3,3,5-trimethylcyclohexanane, hydroperoxides such as 2,5-dimethylhexane-2,5-dihydroperoxide, peroxyesters such as 2,5-dimethyl-2,5-di-tert-butylperoxyhexane, diacyl peroxides such as benzoyl peroxide, and dialkyl peroxides such as dicumyl peroxide.

In addition, polyfunctional substances such as triallyl isocyanurate and those which are commonly used as cross-linking aids in the rubber industry can be compounded.

(F) Sulfur and Sulfur Donor

The sulfur donor is a compound which liberates sulfur at a comparatively high temperature (50° to 200° C.). Typical examples of the sulfur donor are those compounds which have a polysulfide bond. They are listed in *Handbook of Rubber and Plastics Chemicals* (issued in 1974 by Rubber Digest Co., Ltd.), pp. 19–57 and *Materials and Compounding Ingredients for Rubber and Plastics* (issued in 1965 by Publishers Printing Company), pp. 129–146. Examples of the sulfur donors include tetramethylthiuram disulfide, dipentamethylenethiuram disulfide, dipentamethylenethiuram tetrasulfide, and dipentamethylenethiuram hexasulfide. Of these, sulfur donors which liberate sulfur at 100° to 200° C. at which the olefin-based rubber is melted and processed (e.g., dipentamethylenethiuram tetrasulfide) are preferred.

Sulfur compounds as described in pages 1 to 5 of the above-mentioned *Handbook of Rubber and Plastics Chemicals* can also be used as the sulfur donor, such as sulfur monochloride, sulfur dichloride, morpholin disulfide, and alkylphenol disulfide.

The sulfur used in the present invention includes sulfur powder, flower of sulfur, precipitated sulfur, and colloidal sulfur.

The sulfur and sulfur donor used in the invention are also described in *Encyclopedia of Polymer Science and Technology*, vol. 12, p. 256 and vol. 14, p. 740.

(G) Vulcanization Accelerator

A vulcanization accelerator can also be used with the sulfur and/or sulfur donor. The vulcanization accelerator is one which is commonly used in the rubber industry, and it accelerates the vulcanization of the olefin-based rubber with the sulfur and/or sulfur donor. As the result of acceleration, the vulcanization time is reduced, the vulcanization temperature is lowered, and the amount of sulfur and/or sulfur donor is decreased. Examples of the vulcanization accelerator are described in the above-mentioned *Materials and Compounding Ingredients for Rubber and Plastics*, pp. 45–91 and *Encyclopedia of Polymer Science and Technology*, vol. 14, p. 747 and vol. 12, p. 257.

Examples of the vulcanization accelerator used in this invention are classified into thiazole type, imidazoline type, dithiocarbamate type, thiourea type, thiuram type, sulfenamide type, xanthate type, guanidine type, and aldehyde-amine type.

The vulcanization accelerator used in this invention includes, for example, 2-mercaptobenzothiazole, dibenzothiazyl disulfide, zinc, sodium or copper salt of 2-mercaptobenzothiazole, cyclohexylamine salt of 2-mercaptobenzothiazole, 2-(2,4-dinitrophenyl)-mercaptobenzothiazole, N-diethyl-2-benzothiazyl sulfenamide, N-cyclohexyl-2-benzothiazyl sulfenamide, N,N-dicyclohexyl-2-benzothiazyl sulfenamide, N-oxydiethylene-2-benzothiazyl sulfenamide, 2-(2,6-dimethyl-4-morpholinothio)-benzothiazole, N,N-diisopropyl-2-benzothiazyl sulfenamide, N,N-diethylthiocarbamoyl-2-benzothiazolyl sulfide, 2-mercaptoimidazoline-(ethylenethiourea), thiocarbanide, 1,3-bis(2-benzothiazole mercaptomethyl) urea, diethyl thiourea, trialkyl thiourea, tetramethylthiuram monosulfide, tetramethylthiuram disulfide, tetrabutylthiuram disulfide, dipentamethylenethiuram monosulfide, sodium dimethyldithiocarbamate, zinc diethyldithiocarbamate, selenium dimethyldithiocarbamate, sodium pentamethylenedithiocarbamate, N-cyclohexyl-ethyl-ammonium-cyclohexylethyl-dithiocarbamate, piperidine-pentamethylene-dithiocarbamate, pipecoline-pipecolyl-dithiocarbamate, zinc isopropyl-xanthate, dibutyl-xanthogen-disulfide, diphenylguanidine, triphenylguanidine, diorthotolyl-guanidine salt of dicatechol boric acid, n-butylaldehyde-aniline condensate, butylaldehydemonobutylamine condensate, α-ethyl-β-propylacrolein-aniline condensate, hexamethylenetetramine, stearylamine, triethanolamine, triphenylphosphite, and tricresylphosphate.

The sulfur and/or sulfur donor and vulcanization accelerator, which are used for the vulcanization of the composition of this invention, may be combined with a vulcanizing auxiliary (such as metal oxide, fatty acid, and derivatives thereof) and an antiscorch (such as phthalic anhydride and salicylic acid), which are commonly used in the rubber industry. Examples of vulcanizing auxiliary and antiscorch are given in pp. 58 to 68 and pp. 69 to 72, respectively, of the above-mentioned *Handbook of Rubber and Plastics Chemicals*.

In producing the scintillation converter for neutron radiography of the present invention, the olefin rubber, inorganic boron compound and/or inorganic lithium compound, and zinc sulfide-base fluorescent material and, if desired, organic peroxide, or sulfur and/or a sulfur donor, or sulfur and/or a sulfur donor and vulcanization accelerator, are mixed and the resulting mixture of composition is molded in a manner as described hereinafter. If lubricants as described below are further compounded, cross-linking by the organic peroxide or vulcanization by the sulfur or sulfur donor can be improved and, furthermore, kneadability in preparing the composition and its moldability can be improved.

(H) Lubricant

There is not special limitation to the lubricant that is used in the present invention. In particular, aliphatic acids and aliphatic acid amides are preferred. Typical examples of preferred lubricants are stearic acid, hydroxystearic acid, stearic acid composites, stearoamide, oleylamide, erythramide, ricinolamide, behenamide, methylolamide, ethylenebis-stearoamide, methylenebis-stearo-behenamide, and stearoamide.

The physical properties and trade names, for example, of these lubricants are described in detail in *Binran Gomu Plastic-Haigo Yakuhin* (Handbook of Compounding Ingredients for Rubber and Plastics), published by Rubber Digest Co., Ltd., pp. 303 to 312 (1974).

(I) Composition (Mixing Ratio)

The total amount of the inorganic boron compound and inorganic lithium compound added is from 100 to 400 parts by weight, and preferably from 200 to 350 parts by weight, per 100 parts by weight of the olefin rubber (including other polymeric materials if used: the same shall apply hereinafter). If the total amount of the inorganic boron compound and inorganic lithium compound added is less than 100 parts by weight, the dose of α-ray emitted by the neutron is small, and even if the amount of zinc sulfide is increased, the ultimate scintillation converter fails to fluorescence efficiently. Moreover the ability to sense the neutron is low. In particular, the resolution of the converter when a photographic plate is used drops. On the other hand, if it is in excess of 400 parts by weight, the resulting composition becomes difficult to mold. Moreover, it becomes impossible to increase the amount of the zinc sulfide-base fluorescent material, which is most important, above 100 parts by weight per 100 parts by weight of the olefin rubber, and thus the composition of the present invention cannot be prepared.

The amount of the zinc sulfide-base fluorescent material added is from 100 to 600 parts by weight, and preferably from 200 to 400 parts by weight, per 100 parts by weight of the olefin rubber. If the amount of the zinc sulfide-base fluorescent material added is less than 100 parts by weight, even if the inorganic lithium compound emits α-rays, the intensity of fluorescence is low and the resolution of the converter seriously drops because a sufficient amount of zinc sulfide to emit fluorescence is not present around the inorganic lithium compound. On the other hand, if it is in excess of 600 parts by weight, it becomes difficult to increase the amount of the inorganic lithium compound added more than 200 parts by weight per 100 parts by weight of the olefin rubber. Moreover, a uniform composition cannot be obtained, and the resulting composition is difficult to mold.

The amount of the organic peroxide added is from 0.1 to 10 parts by weight, preferably from 0.1 to 5.0 parts by weight, per 100 parts by weight of the olefin rubber. The particularly suitable range is from 0.5 to 5.0 parts by weight. If the amount of the organic peroxide added is in excess of 10 parts by weight, it becomes difficult to control the degree of cross-linking. Moreover, there can be obtained only a scintillation converter which does not have suitable elasticity and is poor in ability to sense radiation.

The total amount of sulfur and sulfur donor added per 100 parts by weight of the olefin rubber is from 0.1 to 10.0 parts by weight, and is preferably from 0.5 to 5.0 parts by weight. If the amount of the sulfur and sulfur donor added is in excess of 10.0 parts by weight, it is difficult to control vulcanization, and there can be obtained only a scintillation converter which does not have suitable elasticity and is poor in ability to sense radiation.

In a case that the vulcanization accelerator is used, the amount of the vulcanization accelerator added is 10.0 parts by weight or less, preferably from 1.0 to 8.0 parts by weight, and particularly preferably from 1.0 to 6.0 parts by weight, per 100 parts by weight of the olefin rubber. Even if the vulcanization accelerator is added in amounts more than 10.0 parts by weight, a scintillation converter more increased in elasticity and abrasion resistance cannot be obtained.

In a case that the lubricant is added, the amount of the lubricant added is 5.0 parts by weight or less, preferably from 0.1 to 3.0 parts by weight, and particularly preferably from 0.2 to 2.0 parts by weight, per 100 parts by weight of the olefin rubber. Even if the lubricant is added in amounts more than 5.0 parts by weight, no further effect can be obtained and the ultimate scintillation converter is reduced in ability to sense radiation.

(J) Preparation of Composition, Molding Method, etc.

The composition of the present invention, which is composed of the olefin rubber, inorganic boron compound and/or inorganic lithium compound, and zinc sulfide-base fluorescent material, or the olefin rubber, inorganic boron compound and/or inorganic lithium compound, zinc sulfide-base fluorescent material, and one or more of the organic peroxide, sulfur, sulfur donor, vulcanization accelerator, and lubricant, is preferably prepared as follows.

The olefin rubber is dry blended with part of the inorganic boron compound and/or inorganic lithium compound and zinc sulfide-base fluorescent material, or the inorganic boron compound and/or inorganic lithium compound, zinc sulfide-base fluorescent material, and one or more of the organic peroxide, sulfur, sulfur donor, vulcanization accelerator, and lubricant, and then the mixture is uniformly melt kneaded. Subsequently it is melt kneaded while successively adding the remainder, inorganic boron compound and/or inorganic lithium compound and zinc sulfide-base fluorescent material, or inorganic boron compound and/or inorganic lithium compound, zinc sulfide-base fluorescent material, and one or more of organic peroxide, sulfur, sulfur donor, vulcanization accelerator, and lubricant so as to prepare a uniform composition. In melt kneading the olefin rubber, inorganic boron compound and/or inorganic lithium compound, and zinc sulfide-base fluorescent material, or the olefin rubber, inorganic boron compound and/or inorganic lithium compound, zinc sulfide-base fluorescent material, and one or more of the organic peroxide, sulfur, sulfur donor, vulcanization accelerator, and lubricant, the olefin rubber is first placed in a Brabender or kneader and thoroughly kneaded while maintaining it above the softening point of the olefin rubber. When the olefin rubber is sufficiently kneaded, part of the inorganic boron compound and/or lithium compound and zinc sulfide-base fluorescent material, or the inorganic boron compound and/or lithium compound, zinc sulfide-base fluorescent material, and one or more of the organic peroxide, sulfur, sulfur donor, vulcanization accelerator, and lubricant is introduced into the Brabender or kneader, and the resulting mixture is thoroughly kneaded. When this kneading is achieved sufficiently, the remaining inorganic boron compound and/or inorganic lithium compound and zinc sulfide-base fluorescent material, or inorganic boron compound and/or inorganic lithium compound, zinc sulfide-base fluorescent material, and one or more of the organic peroxide, sulfur, sulfur donor, vulcanization accelerator, and lubricant is added while kneading so as to prepare the ultimate composition.

The composition of this invention may be incorporated with stabilizers against ozone and oxygen, metal deterioration-preventing agent, filler, plasticizer, softener and flame retarder which are generally used in the field of olefin-based rubbers, during the mixing process. For example, the stabilizers and flame retarder are described on pages 151 to 195, the plasticizer and softener on pages 233 to 362 and the filler on pages 424 to 477, in the above-mentioned *Materials and Compounding Ingredients for Rubber and Plastics.*

In this mixing, even if a mixing method commonly used in the processing of the olefin rubber is employed; for example, the olefin rubber is previously dry blended by the use of a mixer such as a ribbon mixer or tumbler and, thereafter, the resulting mixture is melt kneaded by the use of a mixture such as an oven roll or extruder, it is sometimes impossible to compound more than 600 parts by weight of the inorganic boron compound or inorganic lithium compound to 100 parts by weight of the olefin rubber.

As described above, in compounding the inorganic boron compound and/or inorganic lithium compound and zinc sulfide-base fluorescent material, or the inorganic boron compound and/or inorganic lithium compound, zinc sulfide-base fluorescent material, and one or more of the organic peroxide, sulfur, sulfur donor, vulcanization accelerator, and lubricant to the olefin rubber, it is important that, in the first place, part of the inorganic boron compound and/or inorganic lithium compound and zinc sulfide-base fluorescent material, or the inorganic boron compound and/or inorganic lithium compound, zinc sulfide-base fluorescent material, and one or more of the organic peroxide, sulfur, sulfur donor, vulcanization accelerator, and lubricant is added to the olefin rubber and the resulting mixture is uniformly kneaded and, thereafter, the remaining inorganic boron compound and/or lithium compound and zinc sulfide-base fluorescent material, or inorganic boron compound and/or inorganic lithium compound, zinc sulfide-base fluorescent material, and one or more of the organic oxide, sulfur, a sulfur donor, vulcanization accelerator, and lubricant are added to the mixture while almost uniformly kneading.

In either case, it is important that the olefin rubber not be substantially cross-linked with the organic peroxide or vulcanized with the sulfur or sulfur donor during the melt kneading process. The melt kneading in generally performed at room temperature to 100° C. Melt kneading at a temperature above 100° C. will bring about vulcanization.

The thus-prepared composition is cross-linked and molded into the desired form at a temperature in excess of the softening point of the olefin rubber (usually from 140 to 200° C.) by the use of molding machines such as a press molding machine, an extrusion molding machine, and an injection molding machine which are commonly used in the field of synthetic resins and rubbers.

In molding the composition into a neutron-detecting plate, the composition is shaped into a sheet or film having a thickness of from 100 μm to 1 mm. If the thickness of the mold is large, the inorganic boron compound and/or inorganic lithium compound in the surface layer causes the neutron to change into α-ray and thus the neutron does not enter deeply. Therefore, if the thickness is more than 1 mm, fluorescence is not generated. However, in a case that the neutron-shielding effect is needed at the same time, the thickness may be increased to more than 1 mm; this is favorable from the viewpoint that it results in an increase in shielding capability.

When the thus-produced sheet or film is used as a neutron-detecting plate, it is usually bonded to a plate-shaped member (e.g., an aluminum plate) through an adhesive layer. It is sufficient that the sheet or film be bonded to the plate-shaped member with adhesives which are commercially available. In order to make the surface of the mold uniform and smooth, a film or sheet of adhesive polyethylene modified with unsaturated compounds (e.g., unsaturated carboxylic acids) is used as the adhesive layer; the adhesion effect can be more increased. In a case that an aluminum plate is used as the plate-shaped member, the above adhesive film or sheet is sandwiched between the sheet or film of the composition of the present invention and the aluminum plate, and then pressed by the use of a hot presser, whereupon adhesion is easily accomplished. Moreover, the surface of the mold is reduced in irregularities.

(K) Effects of the Present Invention

The scintillation converter of neutron radiography of the present invention has the following effects or advantages.

(1) Neutron-sensing ability (sensitivity and resolution) is excellent.

(2) Elasticity is excellent.

(3) Abrasion resistance is good.

(4) The converter is tough because of its elasticity.

(5) The converter is light-weight and is convenient to carry.

(6) The converter is inexpensive.

(7) The large surface area of the converter can be produced.

The above-produced neutron-detecting plate can be used not only in various analyses and medical treatment utilizing neutron, but also for the protection of operators from the exposure to neutron radiation by, for example, use as a neutron-sensing badge.

The neutron-detecting plate is an example of uses of the scintillation converter of neutron radiography of the present invention. In addition, the scintillation converter of the present invention can be molded into various forms and used as neutron diffraction slits or detector parts in the fields of instrumental analysis and medical treatment.

The present invention is described in greater detail with reference to the following examples.

EXAMPLE 1

One hundred parts by weight of an ethylene/-propylene/non-conjugated diene terpolymer rubber (Mooney viscosity ($ML_{1+4}$ (100)): 45; non-conjugated diene component: ethylidene-norbornene; iodine value: 25; hereinafter abbreviated to "EPDM") as an olefin rubber was placed in a Brabender maintained at 60° C. and melt kneaded. Part of 200 parts by weight of boron nitride (density: 2.27 g/cm$^3$; weight average diameter: 3.5 $\mu$m) was added to the molten EPDM and almost uniformly kneaded and, thereafter, the remaining boron nitride was gradually added while almost uniformly kneading and uniformly dispersed. Then, 300 parts by weight of silver-activated zinc sulfide (white powder; Ag content: 100 ppm; weight average diameter: 7 $\mu$m) was added to the above mixture and uniformly kneaded. After all the zinc sulfide was added, the resulting mixture was cooled and taken out. The thus-prepared composition was heat pressed by the use of a 50-ton pressing machine maintained at 150° C. to produce a 100 $\mu$m thick sheet having a diameter of 300 mm. This sheet was then placed on an aluminum plate (diameter: 300 mm; thickness: 1.5 mm), and they were heat bonded together by pressing for 1 minute by the use of the same pressing machine as used above, maintained at 150° C.

When the above-produced member was exposed to thermal neutron radiation from a Triga Model II nuclear reactor, it was confirmed that a light-sensitive paper placed on the member was sensitized.

FIGURE is a neutron radiography obtained by exposing Kodak Type AA film placed on the above-produced member to thermal neutron radiation (neutron flux: $1 \times 10^6$ n/cm$^2$/S) using various test patterns.

EXAMPLE 2

To 100 parts by weight of EPDM used in Example 1 was added 2.0 parts by weight of a high molecular polyester (trioctyl trinuritate). Thereafter, the same boron nitride and silver-activated zinc sulfide as used in Example 1 were gradually added while almost uniformly kneading, in the same manner as in Example 1 except that the amounts of the boron nitride and zinc sulfide added were changed to 300 parts by weight and 400 parts by weight, respectively, to prepare a uniform composition. The thus-prepared composition was heat pressed to produce a 200 $\mu$m thick sheet. This sheet was then placed on an aluminum plate (diameter: 400 mm; thickness: 2 mm), and they were then bonded together in the same manner as in Example 1.

Upon irradiation of the above-produced member with thermal neutron radiation in the same manner as in Example 1, it was confirmed that the zinc sulfide emitted light.

EXAMPLE 3

To 100 parts by weight of the same olefin rubber as used in Example 1 was added 30 parts by weight of silicone rubber (dimethyl polysiloxane; average molecular weight: about 160,000). In addition, 2.0 parts by weight of a high molecular weight polyester (trioctyl trimellitate) was added. Then, the same boron nitride and silver-activated zinc sulfide as used in Example 1 were gradually added while uniformly kneading in the same manner as in Example 1 except that the amounts of the boron nitride and zinc sulfide added were changed to 300 parts by weight and 400 parts by weight, respectively, to prepare a uniform composition. The thus-prepared composition was heat pressed in the same manner as in Example 2 to produce a sheet. This sheet was heat bonded to an aluminum plate.

Upon irradiation of the above-produced member with thermal neutron radiation in the same manner as in Example 1, it was confirmed that the zinc sulfide emitted light.

EXAMPLE 4

To 100 parts by weight of EPDM were gradually added 200 parts by weight of boron nitride and 300 parts by weight of silver-activated zinc sulfide, all compounds being the same as used in Example 1, while uniformly kneading to prepare a uniform mixture. After all the compounds were added, 3.0 parts by weight of pentamethylenethiuram tetrasulfide as a vulcanization accelerator, 1.0 part by weight of 2-mercaptobenzothiazole as a sulfur donor, and 1.0 part by weight of stearic acid as a lubricant were added. The resulting mixture was kneaded and then molded into a 1 mm thick sheet. This sheet was placed on an aluminum plate (diameter: 300 mm; thickness: 1.5 mm) and then heat bonded thereto while cross-linking by pressing for 1 minute by the use of the above-described pressing machine maintained at 165° C.

Upon irradiation of the above-produced member with thermal neutron radiation from a Triga Model II nuclear reactor, it was confirmed that a light-sensitive paper placed on the member was sensitized.

EXAMPLE 5

To the composition prepared in Example 2 were added pentamethylenethiuram tetrasulfide, 2-mercaptobenzothiazole, and stearic acid in the same amounts as in Example 4, and the resulting mixture was kneaded. It was then heat pressed to produce a 200 μm thick sheet. This sheet was heat bonded to an aluminum plate (diameter: 400 mm; thickness: 2 mm) while cross-linking in the same manner as in Example 4.

Upon irradiatin of the above-produced member with thermal neutron radiation in the same manner as in Example 4, it was confirmed that the zinc sulfide emitted light.

EXAMPLE 6

To the composition prepared in Example 3 were added pentamethylenethiuram sulfide, 2-mercaptobenzothiazole, and stearic acid in the same amounts as in Example 4, and the resulting mixture was kneaded. The thus-prepared composition was heat pressed in the same manner as in Example 5 to produce a sheet. This sheet was heat bonded to an aluminum plate in the same manner as in Example 5.

Upon irradiation of the above-produced member with thermal neutron radiation, it was confirmed that the zinc sulfide emitted light.

EXAMPLE 7

A mixture was prepared in the same manner as in Example 4 except that stearic acid was not added (the amounts of the other compounds added were the same as in Example 4). The mixture was kneaded and then heat pressed under the same conditions as in Example 5 to produce a sheet. This sheet was heat bonded to an aluminum plate while cross-linking in the same manner as in Example 4.

Upon irradiation of the above-produced member with thermal neutron radiation, it was confirmed that the zinc sulfide emitted light. However, moldability and vulcanizability were somewhat less desirable, although still useful.

EXAMPLE 8

To the mixture or composition prepared in Example 1 were added 3.0 parts by weight of dicumyl peroxide and 1.0 part by weight of stearic acid. The resulting mixture was kneaded and then molded into a 1 mm thick sheet. This sheet was superposed on an aluminum plate (diameter: 300 mm; thickness: 1.5 mm) and then heat bonded thereto while cross-linking by pressing for 5 minutes by the use of the above pressing machine maintained at 165° C.

Upon irradiation of the above-produced member with thermal neutron radiation from a Triga Model II nuclear reactor, it was confirmed that a light-sensitive paper placed on the member was sensitized.

EXAMPLE 9

A composition was prepared in the same manner as in Example 2. To this composition were added dicumyl peroxide and stearic acid in the same amounts as in Example 8, and the resulting mixture was kneaded. It was then heat pressed to produce a 200 μm thick sheet. This sheet was placed on an aluminum plate (diameter: 400 mm; thickness: 2 mm) and heat bonded thereto while cross-linking in the same manner as in Example 8.

Upon irradiation of the above-produced member with thermal neutron radiation in the same manner as in Example 8, it was confirmed that the zinc sulfide emitted light.

EXAMPLE 10

A composition was prepared in the same manner as in Example 8, and the resulting mixture was kneaded. The thus-prepared composition was heat pressed in the same manner as in Example 9 to produce a sheet. This sheet was heat bonded to an aluminum plate while cross-linking in the same manner as in Example 9.

Upon irradiation of the above-produced member with thermal neutron radiation in the same manner as in Example 8, it was confirmed that the zinc sulfide emitted light.

EXAMPLE 11

A mixture was prepared in the same manner as in Example 8 except that stearic acid was not added (the amounts of the other compounds added were the same as in Example 8). The thus-prepared mixture was heat pressed under the same conditions as in Example 9 to produce a sheet. This sheet was heat bonded to an aluminum plate in the same manner as in Example 8.

Upon irradiation of the above-produced member with thermal neutron radiation, it was confirmed that the zinc sulfide emitted light. However, moldability was somewhat inferior, although still useful.

EXAMPLE 12

A mixture was prepared in the same manner as in Example 1 except that 200 parts by weight of lithium fluoride (density: 2.84 g/cm$^3$; purity: 96.5%; weight average diameter: 10 μm) was used in place of boron nitride. This mixture was molded into a 1 mm thick sheet. This sheet was placed on an aluminum plate (diameter: 300 mm; thickness: 1.5 mm) and then heat bonded thereto by pressing for 5 minutes by the use of the above pressing machine maintained at 165° C.

Upon irradiation of the above-produced member with thermal neutron radiation from a Triga Model II nuclear reactor, it was confirmed that a light-sensitive paper placed on the member sensitized.

EXAMPLE 13

EPDM, lithium fluoride and silver-activated zinc sulfide were mixed and kneaded in the same manner as in Example 12. After all the compounds were added, 3.0 parts by weight of dicumyl peroxide was added. The resulting mixture was kneaded and then molded into a 1 mm thick sheet.

EXAMPLE 14

A sheet was produced in the same manner as in Example 13, except that in addition to the dicumyl peroxide, 1.0 part by weight of stearic acid was added.

EXAMPLE 15

EPDM, lithium fluoride, and silver-activated zinc sulfide was mixed and kneaded in the same manner as in Example 12. After all the compounds were added, 1.0 part by weight of 2-mercaptobenzothiazole as a sulfur donor was added. The resulting mixture was kneaded and then molded into a 1 mm thick sheet.

EXAMPLE 16

A sheet was produced in the same manner as in Example 15, except that in addition to 2-mercaptobenzothiazole, 3.0 parts by weight of pentamethylenethiuram tetrasulfide as a vulcanization accelerator was added.

EXAMPLE 17

A sheet was produced in the same manner as in Example 16, except that in addition to pentamethylenethiuram tetrasulfide, 1.0 part by weight of stearic acid was further added.

The sheets produced in Examples 13 to 17 were each placed on an aluminum plate in the same manner as in Example 12. They were then heat bonded while vulcanizing or cross-linking by pressing under the same conditions as in Example 12.

Upon irradiation of each member as prepared above with thermal neutron radiation in the same manner as in Example 12, it was confirmed that a light-sensitive paper was sensitized.

EXAMPLE 18

To 100 parts by weight of EPDM as used in Example 1 was added 2.0 parts by weight of a high molecular weight polyester (trioctyl trinuritate). Subsequently, the same lithium fluoride and silver-activated zinc sulfide as used in Example 12 were gradually added while uniformly kneading in the same manner as in Example 12 except that the amounts of the lithium fluoride and silver-active zinc sulfide added were changed to 300 parts by weight and 400 parts by weight, respectively, to prepare a uniform composition. To the thus-prepared composition were added 3.0 parts by weight of pentaethylenethiuram tetrasulfide, 1.0 part by weight of 2-mercaptobenzothiazole, and 1.0 part by weight of stearic acid, and the resulting mixture was kneaded. This mixture was heat pressed to produce a 200 $\mu$m thick sheet. This sheet was then placed on an aluminum plate (diameter: 400 mm; thickness: 2 mm) and heat bonded thereto while cross-linking.

Upon irradiation of the above-produced member with thermal neutron radiation in the same manner as in Example 12, it was confirmed that the zinc sulfide emitted light.

EXAMPLE 19

To 100 parts by weight of an olefin rubber as used in Example 12 was added 30 parts by weight of silicone rubber as used in Example 3. In addition, 2.0 parts by weight of a high molecular weight polyester (trioctyl trimellitate) was added. Subsequently, the same lithium fluoride and silver-activated zinc sulfide as used in Example 12 were gradually added while uniformly kneading in the same manner as in Example 12 except that the amounts of the lithium fluoride and silver-activated zinc sulfide added were changed to 300 parts by weight and 400 parts by weight, respectively, to prepare a uniform mixture. To this mixture were added pentamethylenethiuram tetrasulfide, 2-mercaptobenzothiazole, and stearic acid in the same amounts as in Example 18, and the resulting mixture was kneaded. The thus-prepared composition was heat pressed in the same manner as in Example 13 to produce a sheet. This sheet was heat bonded to an aluminum plate while cross-linking in the same manner as in Example 13.

Upon irradiation of the above-produced member with thermal neutron radiation, it was confirmed that the zinc sulfide emitted light.

COMPARATIVE EXAMPLE

One hundred parts by weight of a high density polyethylene having a density of 0.956 g/cm$^3$ and M.I. of 5.0 g/10 min was placed in a Brabender and melt kneaded. Part of 200 parts by weight of amorphous boron (density: 1.73 g/cm$^3$; weight average diameter: 10 $\mu$m) was added to the molten high density polyethylene and the resulting mixture was then almost uniformly kneaded. Subsequently the remaining boron was gradually added while dispersing and the mixture was uniformly dispersed and mixed. To this mixture was added 200 parts by weight of silver-activated zinc sulfide as used in Example 1, which were then mixed and kneaded almost uniformly. After all the zinc sulfide was added, the resulting mixture was cooled, and the thus prepared polyethylene composition was taken out. This composition was heat pressed by the use of a pressing machine (50 tons) maintained at 180° C. However, in this case, the composition could not be sufficiently extended; the maximum diameter was only 50 mm. When the above composition was heat pressed by the use of the 50-ton pressing machine maintained at 250° C., there was obtained at a sheet having a thickness of 100 $\mu$m and a diameter of 200 mm.

A 30 $\mu$m thick film of polyethylene modified with maleic anhydride was placed on an aluminum plate (diameter: 300 mm; thickness: 1.5 mm), and the above-produced sheet was further placed on the polyethylene film. The sheet was heat bonded to the aluminum plate by pressing for 1 minute by the use of the above pressing machine maintained at 250° C. In this case, however, the silver-activated zinc turned yellow in color because the pressing was conducted at high temperatures.

Upon irradiation of the above-produced member with thermal neutron radiation from a Triga Model II nuclear reactor, it was confirmed that a light-sensitive paper placed on the member was sensitized. However, the resolution power was very poor.

While the invention has been described in detail and with reference to specific embodiments thereof, it will be apparent to one skilled in the art that various changes and modifications can be made therein without departing from the spirit and scope thereof.

What is claimed is:

1. A scintillation converter for neutron radiography comprising a composition formed of components
   (A) 100 parts by weight of an olefin rubber made mainly of ethylene and propylene,
   (B) from 100 to 400 parts by weight of at least one inorganic compound selected from the group consisting of inorganic boron compounds and inorganic lithium compounds, and
   (C) from 100 to 600 parts by weight of a zinc sulfide-base fluorescent material.

2. The converter as in claim 1, wherein said composition is further formed of component
   (D) from 0.1 to 10.0 parts by weight of an organic peroxide or at least one of sulfur and a sulfur donor.

3. The converter as in claim 1, wherein component (B) comprises an inorganic boron compound.

4. The converter as in claim 1, wherein component (B) comprises an inorganic lithium compound.

5. The converter as in claim 1, wherein said inorganic boron compounds are non-metallic.

6. The converter as in claim 1, wherein component (B) comprises boron nitride.

7. The converter as in claim 1, wherein component (B) comprises lithium fluoride.

8. The converter as in claim 1, wherein component (B) is present in an amount of from 200 to 350 parts by weight, and component (C) is present in an amount of from 200 to 400 parts by weight.

9. The converter as in claim 2, wherein component (B) is present in an amount of from 200 to 350 parts by weight, component (C) is present in an amount of from 200 to 400 parts by weight, and component (D) is present in an amount of from 0.5 to 5.0 parts by weight.

* * * * *